(Model.)
N. B. ELLIOTT & J. T. LLOYD.
CLOTHES POUNDER.
No. 278,522. Patented May 29, 1883.
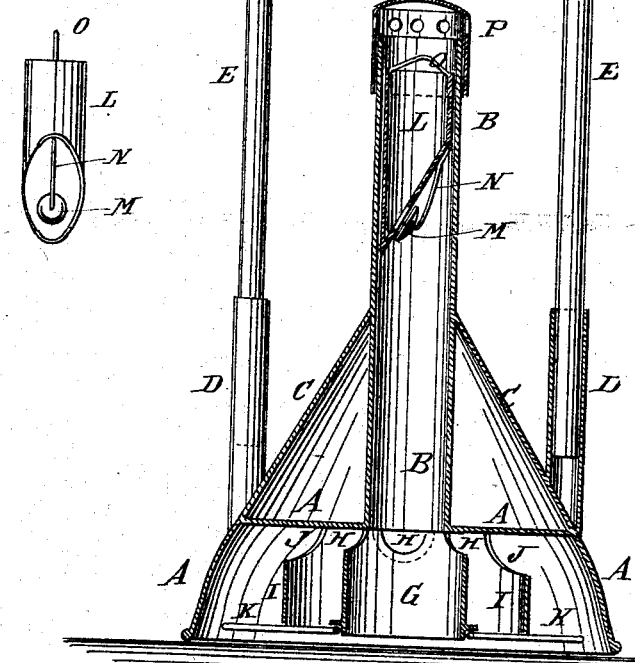
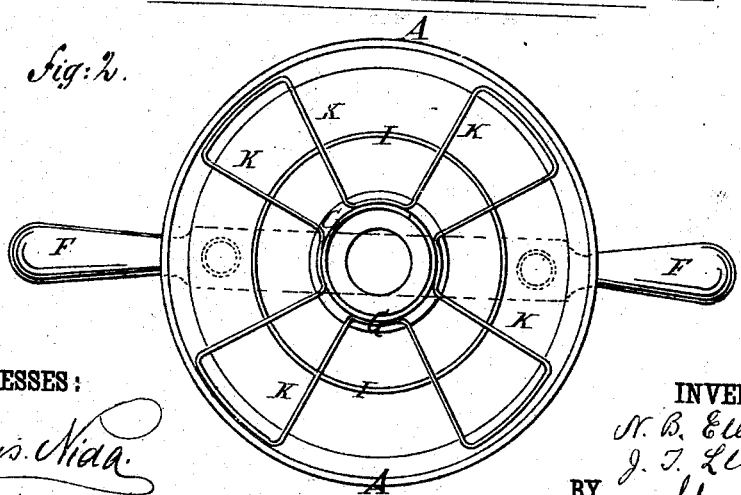
WITNESSES:
Chas. Nida.
B. G. Underwood.
INVENTOR:
N. B. Elliott,
J. T. Lloyd.
BY Munn & Co.
ATTORNEYS.

UNITED STATES PATENT OFFICE.

NOAH B. ELLIOTT AND JOHN T. LLOYD, OF HOLDEN, MISSOURI.

CLOTHES-POUNDER.

SPECIFICATION forming part of Letters Patent No. 278,522, dated May 29, 1883.

Application filed June 30, 1882. (Model.)

*To all whom it may concern:*

Be it known that we, NOAH B. ELLIOTT and JOHN T. LLOYD, of Holden, in the county of Johnson and State of Missouri, have invented certain new and useful Improvements in Pneumatic Clothes-Washers, of which the following is a full, clear, and exact description.

Reference is to be had to the accompanying drawings, forming part of this specification, in which similar letters of reference indicate corresponding parts in all the figures.

Figure 1 is a sectional side elevation of our improvement. Fig. 2 is a bottom view of the same. Fig. 3 is a side elevation of the valve-plug.

The object of this invention is to increase the effectiveness of pneumatic clothes-washers and make them stronger, more effective, more durable, and less liable to injure the clothes.

A is an inverted pan, made with slightly-bulged flaring sides, and with a hole in its bottom, in which is secured the lower end of a tube, B. The tube B is strengthened in position by a conical brace, C, attached to the outer part of the bottom of the pan A and to the tube B, the said tube passing through a hole in the apex of the said cone.

To the opposite sides of the pan A are attached the lower ends of two short tubes, D, to receive the lower ends of two upright bars or handles, E, which are secured in place by set-screws or other suitable means, and the upper ends of which are connected by a cross-bar or hand-piece, F.

To the bottom of the pan A, around the central opening in the said bottom, is secured the end of a tube, G, which is made a little larger than the said opening and of such a length that its lower edge will be a little above the lower edge of the said pan A. In the upper end of the tube G are formed a number of openings, H, for the passage of air.

To the bottom of the pan A, about midway between the tube G and the rim of the said pan, is attached the upper edge of a rim or tube, I, the lower edge of which is a little higher than the lower edge of the tube G. In the upper part of the rim or tube I are formed openings J, for the passage of air. The tubes or rims G I are strengthened in place by wire braces K, attached to the inner side of the lower end of the rim of the pan A and to the outer side of the lower end of the tube G. The wire braces K cross and are secured to the lower edge of the intermediate rim, I. The wire braces K may be formed of a continuous wire, as shown in Fig. 2, or in parts or sections, as may be desired. The wire braces K thus form more and smoother lines of contact with the clothes and are held from springing by the intermediate rim, I, thus making the washer more effective than it would otherwise be.

Within the tube B is placed a plug, L, which is made hollow or with a longitudinal perforation, for the passage of air. The lower end of the opening through the plug L is closed by a valve, M, attached to the lower end of a spring, N, by which it is held closed, and which is attached at its upper end to the upper part of the bevel of the plug L. The valve M is provided with a rubber packing, to form a close joint between the said valve and its seat. To the upper end of the plug L is attached a bail, O, for convenience in inserting and removing the said plug. With this construction the bevel upon the end of the plug L allows the spring N to be made of sufficient length to properly control the valve M.

The upper end of the tube B is covered with a cap, P, which has a number of perforations formed through its upper part, as shown in Fig. 1, to allow air to pass in and out freely. With this construction, as the washer is forced down upon the clothes the air within the said washer is compressed and acts as an elastic pounder upon the clothes, forcing the water out of the said clothes, and as the washer is raised the air-pressure opens the valve M and the air passes through the tube B into the interior of the washer, so that the washer can be raised easily and will not raise the clothes with it, as would otherwise be the case.

Having thus fully described our invention, we claim as new and desire to secure by Letters Patent—

A pneumatic clothes-washer, constructed substantially as herein shown and described, and consisting of the pan A, having tube B, conical brace C, and handle-sockets D, the tube G, having opening in its upper part, the intermediate rim, I, having openings in its upper part, the wire braces K, the handles E F, and the hollow plug L, having spring-pressed valve N M, as set forth.

NOAH B. ELLIOTT.
JOHN T. LLOYD.

Witnesses:
R. H. TATLOW,
LLOYD U. DICK.